United States Patent
Liste et al.

(10) Patent No.: US 9,686,186 B2
(45) Date of Patent: Jun. 20, 2017

(54) TRAFFIC FLOW IDENTIFIERS RESISTANT TO TRAFFIC ANALYSIS

(71) Applicant: Cisco Technology, Inc., San Jose, CA (US)

(72) Inventors: Jose Liste, Sunnvale, CA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 14/693,244

(22) Filed: Apr. 22, 2015

(65) Prior Publication Data

US 2016/0315853 A1   Oct. 27, 2016

(51) Int. Cl.
H04W 12/00 (2009.01)
H04L 12/721 (2013.01)
H04L 29/06 (2006.01)

(52) U.S. Cl.
CPC .............. H04L 45/38 (2013.01); H04L 63/00 (2013.01); H04L 69/22 (2013.01)

(58) Field of Classification Search
None
See application file for complete search history.

(56) References Cited

U.S. PATENT DOCUMENTS

| | | | |
|---|---|---|---|
| 7,500,264 B1 | 3/2009 | Leavy et al. | |
| 8,024,560 B1 * | 9/2011 | Alten | H04L 63/0428 713/156 |
| 8,949,582 B2 | 2/2015 | Mital et al. | |
| 2009/0103731 A1 * | 4/2009 | Sarikaya | H04L 63/065 380/270 |
| 2012/0287946 A1 | 11/2012 | Matthews et al. | |
| 2013/0003549 A1 | 1/2013 | Matthews et al. | |
| 2013/0091349 A1 | 4/2013 | Chopra | |
| 2014/0013397 A1 * | 1/2014 | Nakano | H04L 63/08 726/4 |
| 2015/0180769 A1 * | 6/2015 | Wang | H04L 45/38 370/236 |

OTHER PUBLICATIONS

Henke et al., "Empirical Evaluation of Hash Functions for Multipoint Measurements", ACM SIGCOMM Computer Communication Review, vol. 38, No. 3, Jul. 2008, pp. 41-50.
"Virtual Bridged Local Area Networks—Amendment: Equal Cost Multiple Paths (ECMP)", IEEE P802.1Qbp/D1.7, Sep. 11, 2013, 123 pages.

* cited by examiner

Primary Examiner — Chi H Pham
Assistant Examiner — Shick Hom
(74) Attorney, Agent, or Firm — Edell, Shapiro & Finnan, LLC

(57) ABSTRACT

A network device receives packets for one or more traffic flows to be sent into a network. The network device computes a flow identifier for each of the one or more traffic flows based on information contained in one or more headers of the packets for each of the one or more traffic flows and based on at least one value that is changed on an ongoing basis. The packets for each of the one or more traffic flows are encrypted to produce encrypted packets for each of the one or more traffic flows. An encapsulation is added to the encrypted packets for the one or more traffic flows. The flow identifier is included in a field of the encapsulation for a corresponding traffic flow.

18 Claims, 7 Drawing Sheets

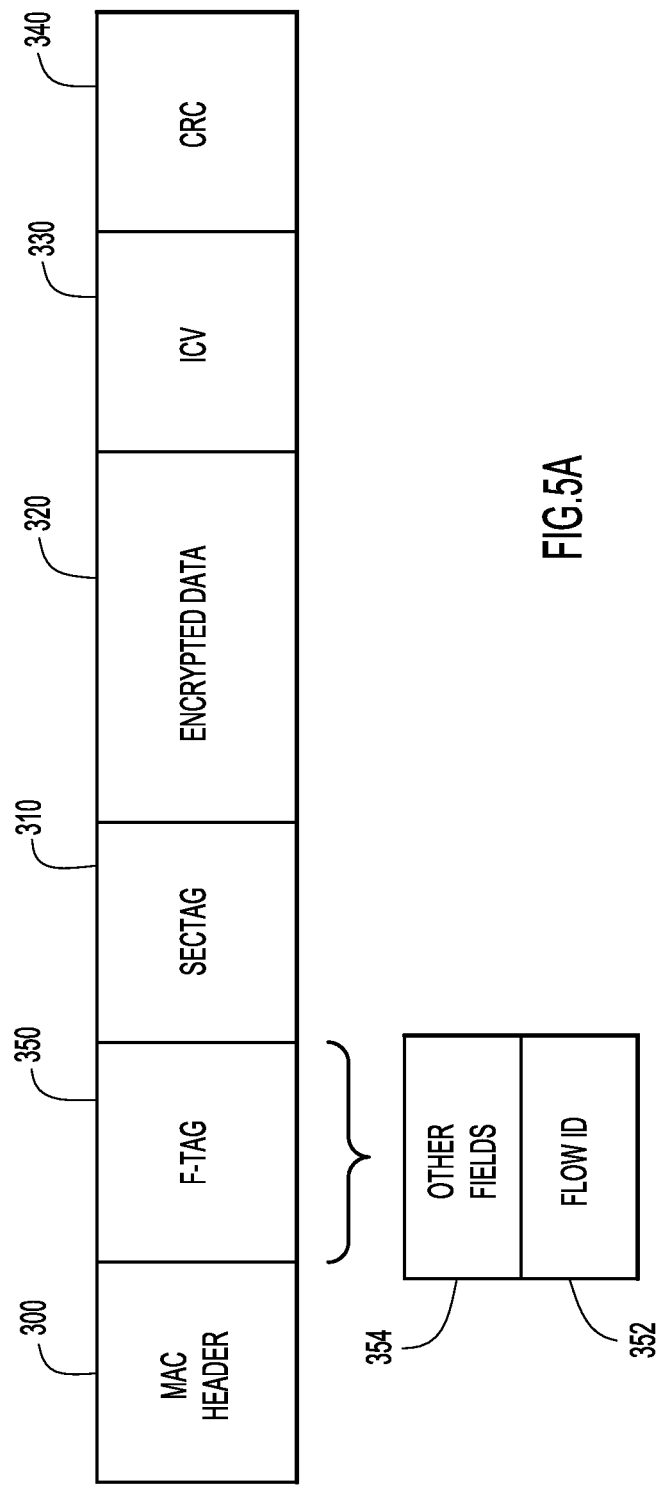

TRAFFIC FLOW IDENTIFIERS RESISTANT TO TRAFFIC ANALYSIS

TECHNICAL FIELD

The present disclosure relates to controlling traffic flow through a network.

BACKGROUND

Service providers commonly desire to load balance their networks at a granularity of "flows", where a "flow" is based on a set of header fields. Examples of such header fields include Media Access Control (MAC) addresses, Internet Protocol (IP) addresses, Transmission Control Protocol (TCP) ports, User Datagram Protocol (UDP) ports, etc. It is useful to ensure all of the packets or frames within a flow are transmitted across the same path to ensure a constant latency, consistent packet ordering, and a consistent Maximum Transmission Unit (MTU) for the flow.

A packet flow is referenced by a flow identifier, which is generally a hash of chosen network fields. The service provider network then delivers all packets marked with a particular flow identifier across the same set of network links. While different flows delivered to the service provider may travel across different sets of network links, all packets with the same flow identifier will be delivered the same way. This is often known as Equal Cost Multiple Paths (ECMPs).

BRIEF DESCRIPTION OF THE DRAWINGS

FIGS. 5A and 5B are diagrams illustrating other types of packet encapsulations to which the flow identifier can be inserted, according to an example embodiment.

DESCRIPTION OF EXAMPLE EMBODIMENTS

Overview

In accordance with one embodiment, a network device receives packets for one or more traffic flows to be sent into a network. The network device computes a flow identifier for each of the one or more traffic flows based on information contained in one or more headers of packets for each of the one or more traffic flows and based on at least one value that is changed on an ongoing basis. The packets for each of the one or more traffic flows are encrypted to produce encrypted packets for each of the one or more traffic flows. An encapsulation is added to the encrypted packets for the one or more traffic flows. The flow identifier is included in a field of the encapsulation for a corresponding traffic flow.

Example Embodiments

Figure 1:
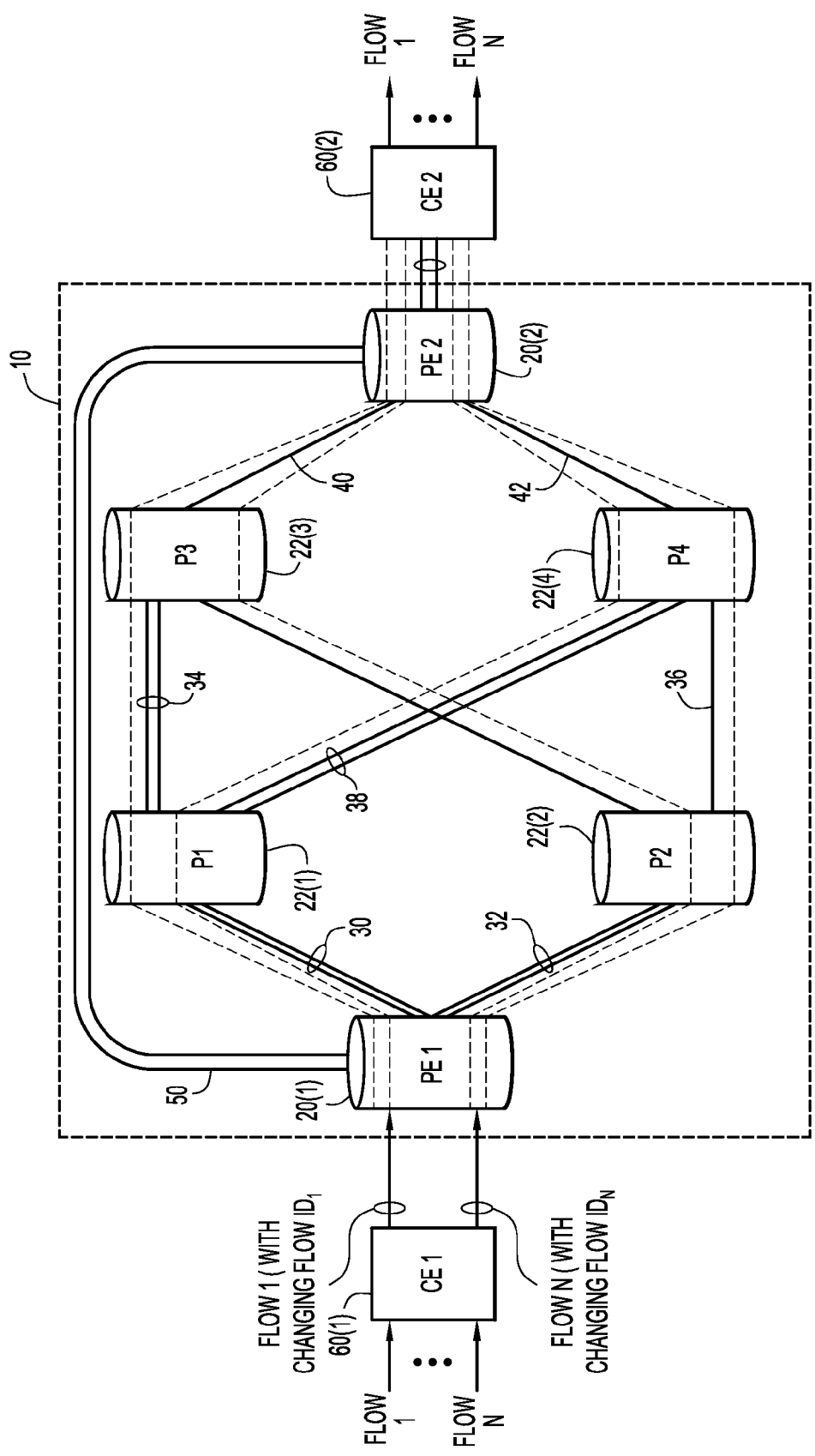
FIG. 1 is a block diagram of a network environment in which traffic flow identifiers are generated and inserted into encapsulated packets, according to an example embodiment.

Reference is made to FIG. 1. FIG. 1 illustrates a service provider (SP) network 10. The service provider network 10 may include any number and variety of network devices. As merely an example, FIG. 1 shows that the SP network 10 includes provider edge (PE) devices 20(1) and 20(2), also denoted PE1 and PE2, respectively, as well as network devices 22(1)-22(4) between provider edge devices 20(1) and 20(2). The network devices 20(1), 20(2) and 22(1)-22(4) may be routers, switches, gateways, for example. There are connections (links) between the network devices that define various paths between the provider edge devices 20(1) and 20(2). For example, there are links 30 between provider edge device 20(1) and network device 22(1), and links 32 between provider edge device 20(1) and network device 22(2). There are links 34 between network device 22(1) and network device 22(3), links 36 between network device 22(2) and 22(4) and links 38 between network device 22(1) and network device 22(4). In addition, there are links 40 between network device 22(3) and provider edge device 20(2) and links 42 between network device 22(4) and provider edge device 20(2).

FIG. 1 also shows an example of one Ethernet Virtual Circuit (EVC) 50 between the provider edge devices 20(1) and 20(2). The EVC 50 could be instantiated as Pseudowires according to the IETF RFC 4447 as well as ITU-T Recommendations, or using a different tunneling technique between provider edge devices 20(1) and 20(2).

There are customer edge (CE) network devices, e.g., routers, 60(1) and 60(2), connected to the service provider network 10. For example, Customer A may lease/purchase an EVC between a pair of CE routers connected to two PE routers of service provider network 10. The service provider may use label-based switching (such as Multiprotocol Label Switching, MPLS) or some other Layer 2 Virtual Private Network (L2VPN) technology to route the packets as between the PE routers 20(1) and 20(2).

In current techniques, when an ingress provider edge device receives a customer packet, the ingress provider edge device calculates a flow identifier, and applies it to the frame. The flow identifier is then carried throughout the service provider network 10 to the egress provider edge router. The techniques presented herein deviate from current practice by configuring a customer edge device to generate and add flow identifiers to packets that are supplied to the service provider network.

In the example shown in FIG. 1, the customer edge network device 60(1) is sending network traffic flows, denoted Flow 1-Flow N, into the network 10, ultimately to be delivered to customer edge network device 60(2). It should be understood that customer edge network device 60(2) also may send traffic flows into network 10. As explained in further detail hereinafter, the customer edge network device 60(1) is configured to generate a flow identifier (Flow ID) for each traffic flow, wherein the Flow ID for the respective traffic flow changes over time. Specifically, the CE network device 60(1) will receive packets for Flow 1, generate Flow $ID_1$ and add Flow $ID_1$ to a field of an encapsulation for packets for Flow 1. Moreover, Flow $ID_1$ will be changed over time. The CE network device 60(1) will do the same for each of the Flows 1-N. Thus, packets of Flow N will have added thereto Flow $ID_N$ which will change over time.

In FIG. 1, each of the dotted lines between devices in the service provider network 10 indicates a path for one flow of a particular customer's traffic within that EVC. When a different Flow ID is applied to the respective flows, the flows take different paths through the service provider network 10 based on the service provider's policy.

Equal Cost Multiple Path (ECMP) is applied to Internet Protocol (IP) packets within the service provider network 10. Newer IP overlay technologies, such as Virtual Extensible Local Area Network (VXLAN) and the Locator Identifier Separation Protocol (LISP) include a User Datagram Protocol (UDP) header as part of their encapsulation. As defined in RFC 6830, the sender selects a source port based on the 5-tuple of the inner header. This source port acts as a flow identifier, added by the sender for the use of the SP.

A service provider wants to spread customer traffic flows out within its network for load balancing, etc. The service provider cannot spread traffic flows if the customer traffic hides the information used to create the flows, in which case the service provider equipment have visibility only to the network addresses of the source and destination customer devices. In this case, the EVC 50 is owned/operated by the service provider to transmit all traffic via a single path through the service provider network when unable to track the flows. However, a service provider wants to break up and distribute customer traffic within the service provider network 10 to load balance, but also to maintain in-order packet delivery for particular flows.

Customers are increasingly encrypting traffic upon which a service provider network expects to apply ECMP. There are two problems that are faced by the service provider that frustrate the use of ECMP on encrypted packets.

First, when a flow identifier is applied to a packet, it effectively marks a flow. In the case of an unencrypted packet, this does not add any threat vulnerability to the packet since the values used to compute the flow identifier are also visible. However, in the case of an encrypted packet, the flow identifier leaks information to a passive man-in-the-middle attacker, which can at least identify long term traffic flows and perform traffic analysis on them. Additionally, if the attacker has obtained any information about the victim's network and addressing plan of that network, it may also enable the attacker to create a dictionary of traffic flows, and from the dictionary the attacker can determine the addresses and ports that make up a traffic flow, and thus identify the actual hosts involved in the traffic flows between endpoints (in both directions). This could present a serious privacy issue for some customers, who are depending on the L2 or L3 encryption methods for protection from pervasive passive man-in-the-middle attackers. As customers begin to apply encryption more pervasively, they will believe that they are protected but flow identifiers may betray them.

Second, in some cases the network encryption method will encrypt the information used to generate a flow identifier, which seriously degrades the effectiveness of ECMP, perhaps to the point of being completely ineffective. For example, the customer applies Media Access Control Security (MACsec) to a frame before delivering it to the provider edge device (because it has a business requirement to protect traffic crossing the EVC). MACsec hides the IP source and destination addresses, L4 ports, etc., that the service provider network is accustomed to using to create a flow identifier.

Furthermore, the customer edge devices are increasingly becoming L3 devices, so even the MAC addresses that might be used by the service provider network for hashing will be identical for all frames passed within a particular EVC. ECMP has been rendered totally ineffective in this situation. The service provider network can no longer load balance flows within the EVC, and cannot load balance the networks in the manner to which they are accustomed. Since the service provider network equipment cannot generate a flow identifier, it may not be able to satisfy its Service Level Agreement (SLA) promised to the customer. As MACsec is increasingly used to provide confidentiality and privacy, service providers either will have to take the risk of not meeting their Service Level Agreements, or will have to provision more equipment in the service provider core network.

This is a serious problem for service providers. The Service Level Agreement guarantees a certain level of performance (e.g. bandwidth, delay, jitter, loss, and/or uptime) through the EVC. Service providers offer Ethernet services over User to Network Interfaces (UNIs) of varying speeds ranging from 10/100 Mbps and all the way to 10 Gbps. Even though services are sold at a sub-rate of the UNI speed (via ingress policing), service providers are experiencing a growing demand for high speed (n×Gbps) Ethernet services. This requirement results in the service provider building complex networks with built-in redundancy and alternate paths between provider edge devices, most of which are achieved using 10 Gigabit Ethernet interfaces and corresponding Ethernet bundles. As a result of a larger ratio between access and core speeds, service providers are faced with the requirement that traffic be load balanced across the core links, such that traffic within one EVC may travel across multiple paths through the service provider network.

Consider the case of using IP Security (IPsec) to protect traffic before it is delivered to a service provider network (i.e., EVC, MPLS network, or Internet service provider). This will also completely render ECMP useless, because the L3/L4 information for the flow has been obscured, and the L2 addresses will be identical for the entire IPsec tunnel. As a result, there will be one flow identifier computed for the entire session.

In another example, a customer may desire to support IPsec over UDP, with a method similar to the LISP example described above. There is a desire to apply ECMP to IPsec packets, and to do this the IPsec packets would need to be UDP-encapsulated and a flow identifier added to the source port of the UDP header. This differs from the current Network Address Translation (NAT)-T encapsulation of IPsec packets, where the source port or destination port is a fixed value (4500), and may be changed by NAT devices in the middle. This is a different encapsulation for a different purpose.

Still another situation is becoming more common. IPsec Encapsulating Security Payload (ESP) packets are encapsulated in overlay headers (e.g., VXLAN or LISP). The encapsulated frame is the IPsec packet. The UDP header with the flow identifier is intact for the service provider to use for ECMP. However, since the hash calculation is done following encryption, an IPsec tunnel with static addresses will yield the same ECMP flow identifier.

According to the embodiments presented herein, as described above in connection with FIG. 1, the Flow ID (e.g., hash id) for each flow is changed from time-to-time before the packets are sent into the service provider network. The customer edge devices, e.g., network devices 60(1) and 60(2), generate the Flow ID for a flow, store the Flow ID for a flow, encrypt each packet of a flow, add the Flow ID to a header of a packet when encapsulating the packet, and send the encrypted and encapsulated packet into the service provider network. The customer edge devices change the Flow ID on an ongoing basis. The time interval at which the Flow ID is changed may be unpredictable or predictable, e.g., random, periodic, on occasion, etc. The frequency at which the Flow ID for a given flow is changed could be adjusted as needed for different levels of security. As to the service provider, there is a consistent Flow ID (e.g., hash-id) for some period of time. The manner in which the Flow ID is computed by the customer edge devices does not need to be revealed to the service provider network. The devices in the service provider network 10 do not know how the Flow ID is computed, they just use the Flow ID to perform ECMP load balancing as they normally would. That is, the network devices in the service provider network 10 look at the Flow ID of a packet and use it to determine which path to use for the packet.

Figure 2:
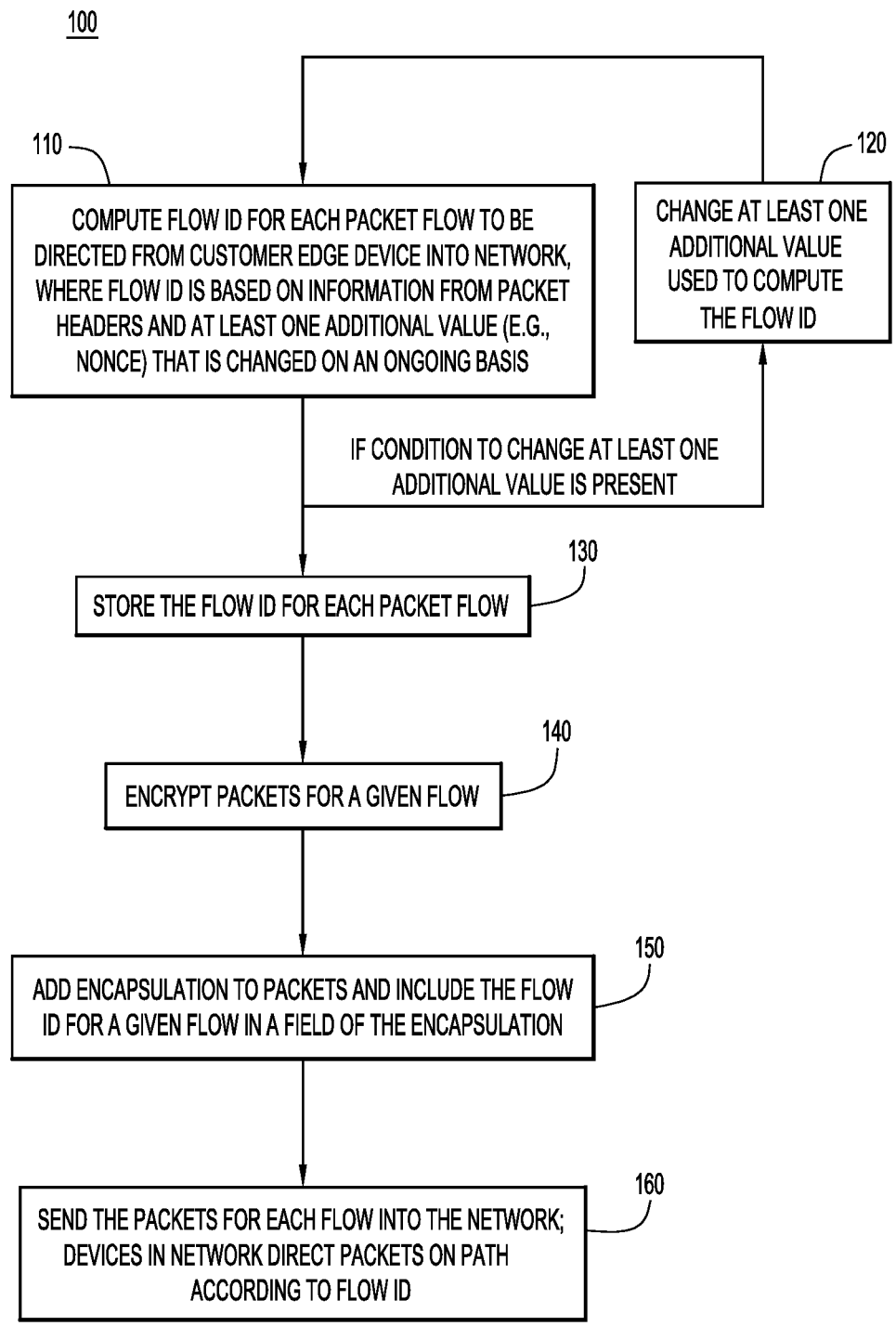
FIG. 2 is a flow chart of a method for generating and inserting a traffic flow identifier according to an example embodiment.

Reference is now made to FIG. 2. FIG. 2 illustrates a flow chart for a method 100 according to an embodiment. The method 100 provides an effective Flow ID for ECMP, and also mitigates the threat of traffic analysis by a pervasive passive attacker desiring to capture packets from a particular flow. This method is performed by a network device seeking to send packets into a network where ECMP may be applied, such as a customer edge network device as shown in FIG. 1. The network device may be a switch, router, gateway, e.g., VPN gateway, etc.

At 110, the network device computes a Flow ID for each packet flow to be directed into a network. The Flow ID for each flow is computed based on information from packet headers and at least one additional value (e.g., a nonce) that is changed from time-to-time. A nonce is an arbitrary number used for a period of time. It may be a random or pseudo-random number. That is, the at least one (additional) value is changed on an ongoing basis, as described hereinafter. The Flow ID for each flow is stored and used for packets of the corresponding flow for a period of time, and then it is changed by changing the at least one (additional) value, as shown at step 120. The changing of the at least one value (e.g., a cryptographic nonce) may be on a periodic basis, non-periodic basis, occasionally/on-demand, unpredictably/randomly, etc. In any event, once computed, the Flow ID for a given flow is stored at 130, and used for all packets of that flow, until the Flow ID is updated (due to a change in the at least one additional value), after which the new Flow ID is computed, stored and used for all packets of that flow.

More specifically, at 140, packets for a given flow are encrypted (using MACsec, IPsec, etc.). At 150, encapsulation is added to the packets for a given flow, and in so doing, the Flow ID is included in a field of the encapsulation. For example, the Flow ID is inserted into an outer (unencrypted) header field of the encapsulation of packets for a given flow. Examples of fields into which the Flow ID may be inserted are described below in connection with FIGS. 4, 5A and 5B. At 160, the packets for each flow are sent into the network. The devices in the network examine the Flow ID of packets and direct the packets on a path according to the Flow ID.

Figure 3:
FIG. 3 is a diagram depicting fields of packet headers and at least one additional value used to compute the flow identifier, according to an example embodiment.

Reference is now made to FIG. 3. FIG. 3 illustrates an example of the parameters used to compute a Flow ID for a packet. In this example, a SHA1 hash computation is performed on the IP source address (IP-src), IP destination address (IP-dst), source port (src-port), destination port (dst-port), and nonce. The IP-src, IP-dst, src-port, and dst-port parameter values are obtained from the packet headers before the packet is encrypted. Other hash computations are possible, and other additional values may be used. For example, instead of a nonce, a value based on a time value (e.g., the number of seconds since system start) may be used. This would enable a change of a Flow ID every second, for example. The resulting Flow ID will have at least as good, and probably better, entropy than current practice using only the header information.

The nonce or other value that is changed from time-to-time is known only to the customer network equipment. The Flow ID may be computed fresh for every packet rather than storing a Flow ID for each flow that is used for a period of time for the respective flow, then recomputed (using a different nonce or other value) and stored for use for a time interval. Thus, step 130 shown in FIG. 2 is optional, and when the Flow ID is not stored, it is computed for each packet.

To elaborate, reference is made back to FIG. 1. FIG. 1 shows that the customer network device 60(1) receives packets for a plurality of different traffic flows, Flow 1-Flow N. When the techniques described above are applied to packets for each of these flows, this means that the Flow $ID_1$ will be changed from time-to-time, Flow $ID_2$, will be changed from time-to-time and Flow $ID_N$ will be changed from time-to-time. The timing (e.g., frequency) for which Flow $ID_1$ is changed for Flow 1 need not be the same as that for any of the other flows handled by the customer network device 60(1). Moreover, the value that is changed (e.g., nonce) when computing the Flow ID need not be the same for any of the one or more other flows.

It should be noted that at the time the nonce (or other value) is changed, the service provider cannot enforce a strict guarantee that frames within the same flow containing different Flow IDs will be delivered in order. This is because frames with different hash-id values may take different paths through the service provider network. It may be that one or more frames are out of order. However, this is not a problem for either IPsec or MACsec, as both maintain a replay window that allows for out of order packets.

Figure 4:
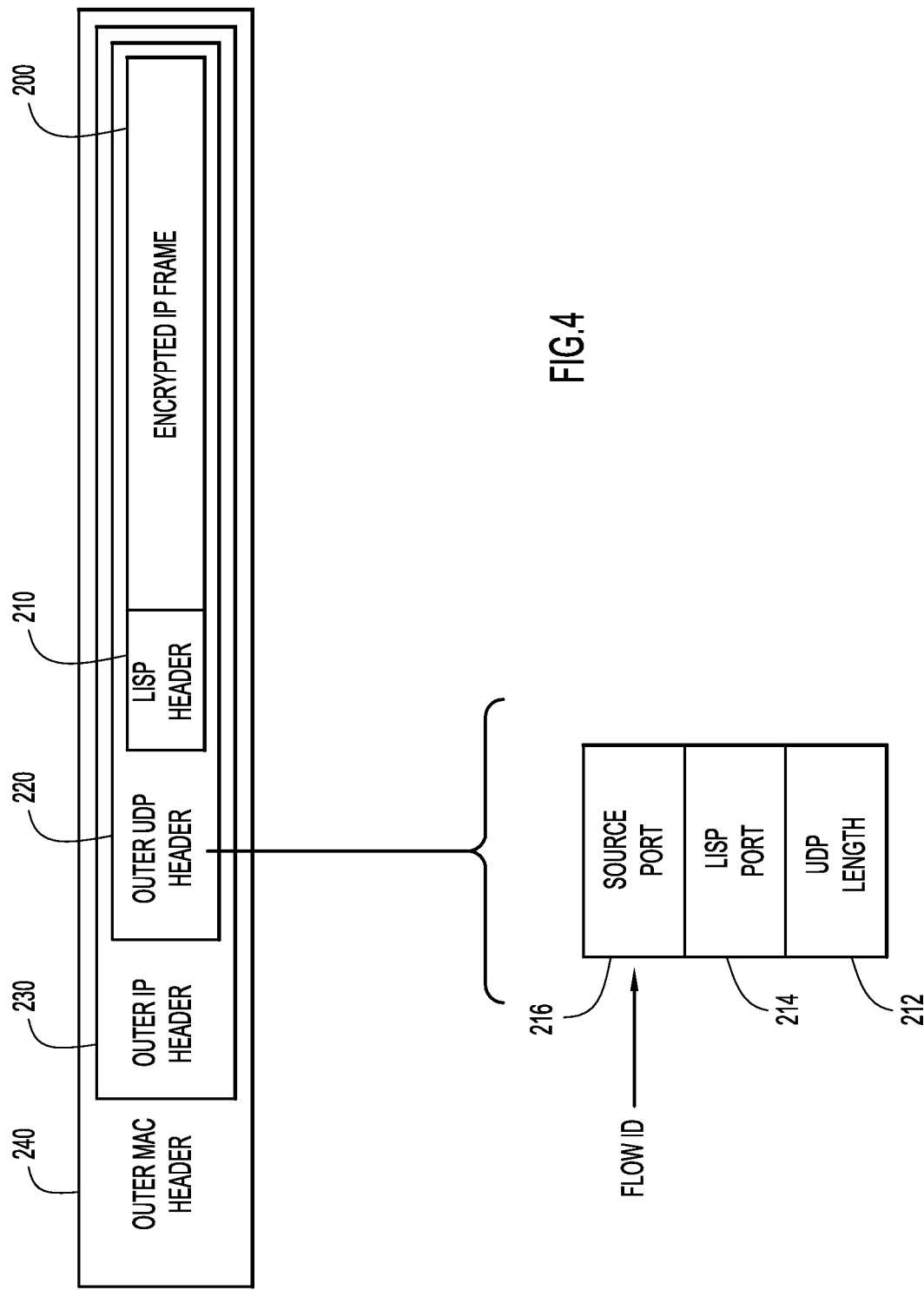
FIG. 4 is a diagram illustrating a first type of packet encapsulation to which the flow identifier can be inserted, according to an example embodiment.

There are numerous encapsulation formats to which these techniques may be applied. Reference is now made to FIG. 4 for a first encapsulation example. FIG. 4 shows a LISP packet structure that supports IPSec over LISP. Specifically, FIG. 4 shows an encrypted IP frame 200 and a LISP header 210 encapsulated in an outer UDP header 220. There is an outer IP header 230 and an outer MAC header 240. The outer UDP header 220 includes several fields, including a UDP length field 212, LISP port field 214 and source port field 216. For the LISP packet structure shown in FIG. 4, the aforementioned Flow ID may be inserted into the source port field 216 of the outer UDP header 220.

Implementing these techniques with MACsec is different because MACsec traditionally happens as the last operation before the frame is delivered to the Ethernet medium. However, a facility exists in some MACsec implementations to create a MACsec frame that is preceded by an unencrypted Customer Virtual Local Area Network (VLAN) tag (C-TAG) (IEEE 802.1Q), which is available for the service provider to map traffic into a particular EVC. This same facility can be made to carry a Flow ID computed and changed as described herein. The Flow ID may be inserted either in a "Flow" C-TAG or in an F-TAG (an Ethernet tag defined in IEEE 802.1Qbp-2014 specifically to carry a Flow ID).

FIG. 5A illustrates an example for a MACsec implementation of the techniques presented herein. A MAC header 300 is provided, along with a security tag (SecTag) 310, the encrypted data 320, an integrity check value (ICV) 330, a cyclic redundancy check (CRC) 340, and F-TAG 350. The F-TAG includes a field 352 into which the Flow ID is inserted and other fields shown at reference numeral 354. For a MACsec packet, the packet is sent over an EVC (as shown in FIG. 1) and ingress equipment in the service provider network uses the F-TAG for load balancing, and adds other packet encapsulations, as necessary.

Figure 5B:
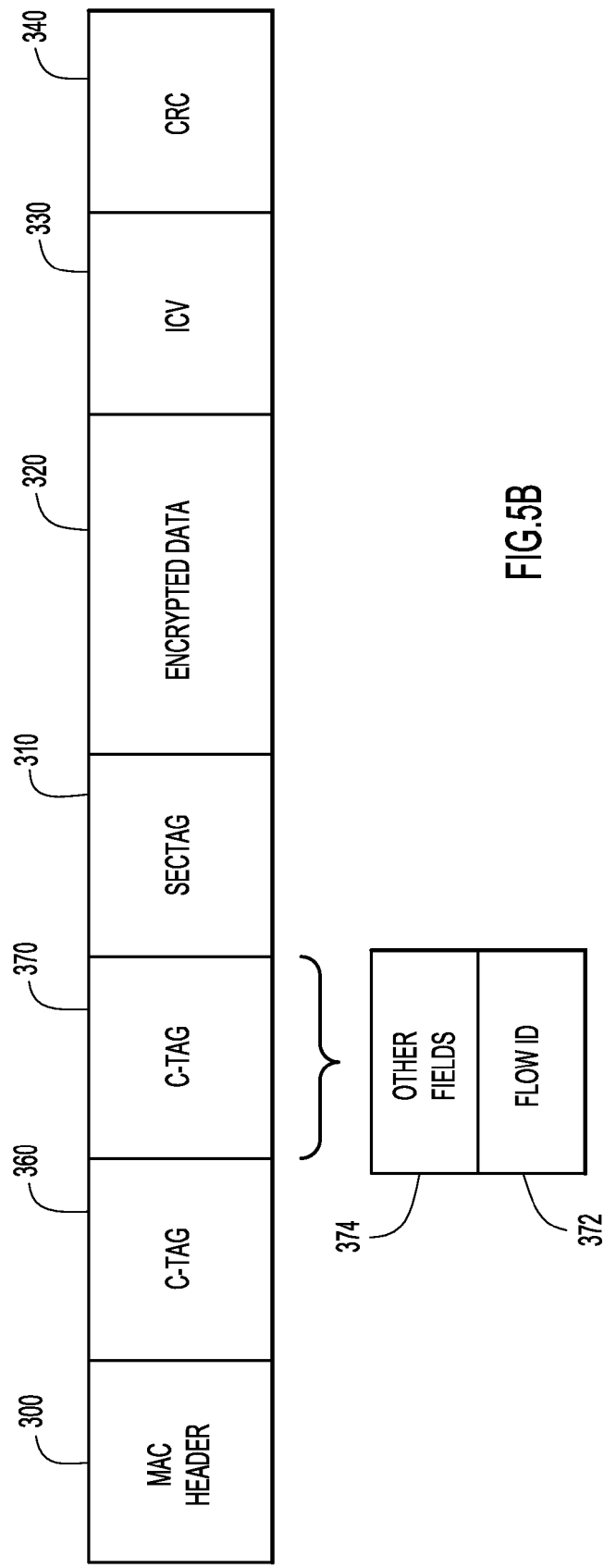

FIG. 5B illustrates another example for MACsec implementation of the techniques presented herein. Like FIG. 5A, there is a MAC header 300, SecTag 310, encrypted data 320, an ICV 330 and a CRC 340. There are two C-TAGs: an outermost C-TAG 360 and an innermost C-TAG 370. The outermost C-TAG 360 carries a VLAN ID as is normally the case for a C-TAG. The innermost C-TAG 370 has a field 372 that carries the Flow ID described herein and other fields shown at 374. Both C-TAGs 360 and 370 are "in-the-clear" (not encrypted) so that a service provider device can perform both service multiplexing as well as load-balancing based on their content. For a MACsec packet, traffic matching a particular customer VLAN ID (located in the outermost C-TAG 360) is sent over an EVC (e.g., EVC 50 shown in FIG. 1) while ingress equipment in the service provider network uses the innermost C-TAG 370 for load balancing, and adds other packet encapsulations, as necessary.

FIGS. 5A and 5B are examples of use cases (e.g., MACsec use cases) in which a network device adds a Flow ID into "unencrypted" frame fields that could include the F-TAG and/or a re-purposed C-TAG. For example, when a service provider sets up an EVC for a customer, a provider edge device would be configured to load balance traffic using the Flow ID field as an input key to its hashing algorithm. For example, a provider edge router can be configured to read the Flow C-TAG or F-TAG in the ingress Ethernet service frame and use this to calculate corresponding Multiprotocol Label Switching (MPLS) labels that carry the Flow ID information that would later be used by MPLS provider routers in the core. There are several methods available for the encoding of the Flow ID inside MPLS labels, such as a Flow Aware Transport (FAT) PW (IETF RFC 6391) or an Entropy Label (IETF RFC 6790). Thus, in general, the Flow ID may be included in a field of a tag of a packet encapsulated according to an Ethernet tagging protocol.

Figure 6:
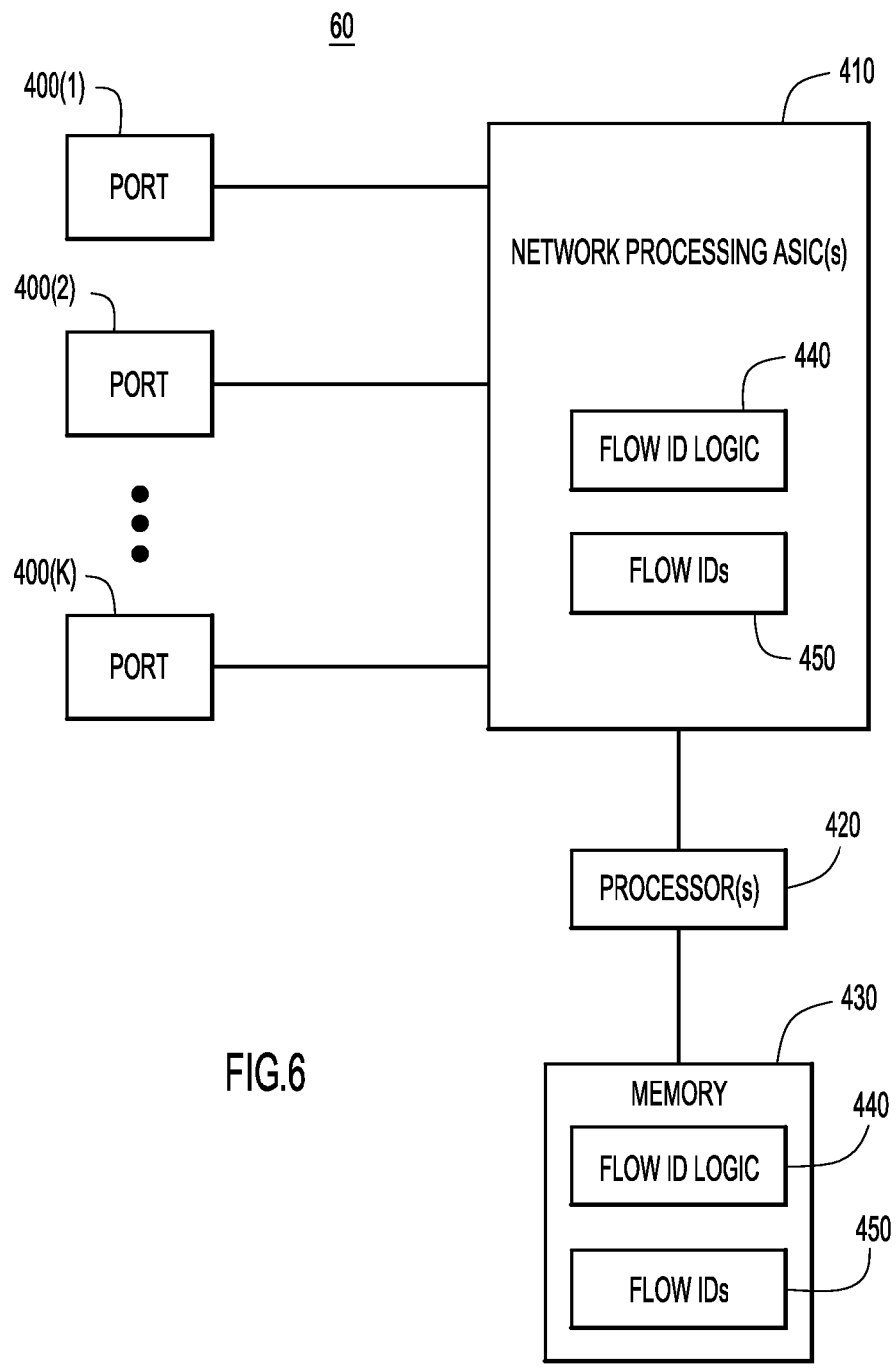
FIG. 6 is a block diagram of a network device that is configured to generate and insert the flow identifier, according to an example embodiment.

Turning now to FIG. 6, a diagram is shown of a network device, such as a customer edge device, configured to generate and insert Flow IDs for packet flows sent into a network. The network device is generically identified by reference numeral 60 and is representative of any customer edge network device shown in FIG. 1, or in general, any network device that would need to add a Flow ID. The network device 60 includes a plurality of network ports 400(1)-400(K), one or more network processing Application Specific Integrated Circuits (ASICs) 410, a processor 420 (or multiple processors), and memory 430. The network ports 400(1)-400(K) receive inbound packets to the network device 60 and send outbound packets from the network device 60. The processor 420 may be a microprocessor or microcontroller, for example.

The network processing ASIC(s) 410 determines which port to direct an incoming packet out of the network device 60 into a network. The network processing ASIC(s) 410 include tables and other logic to make these decisions. In addition, the network processing ASICs may include Flow ID logic 440 to generate a Flow ID for each network traffic flow that is received by the network device 60 and to be directed out of the network device 60. The Flow ID logic 440, when included as part of the functions of the network processing ASIC(s) 410, may be embodied as digital logic gates, which enable the network processing ASIC(s) to perform the operations described above in connection with FIGS. 1-5. In addition, the Flow ID logic 440 stores Flow IDs as shown at reference numeral 450 for traffic flows (as they are changed) that pass through the network device 60.

In another form, the Flow ID logic 440 may be embodied by processor executable instructions stored in memory 430, and executed by the processor 420. The Flow IDs 450 may also be stored in the memory 430.

The memory 430 may include read only memory (ROM), random access memory (RAM), magnetic disk storage media devices, optical storage media devices, flash memory devices, electrical, optical, or other physical/tangible memory storage devices. Thus, in general, the memory 430 may comprise one or more tangible (non-transitory) computer readable storage media (e.g., a memory device) encoded with software comprising computer executable instructions and when the software is executed (by the processor 420) it is operable to perform the operations described herein.

In still a further variation, the operations of the network device 60, and the generation of the Flow IDs, may be perform entirely in software, as would be the case for a software-implemented/virtual network element.

To summarize, prior to encryption, a device computes a Flow ID that represents a traffic flow for a period of time, and after encryption, the Flow ID is added to a field of the packet as part of an encapsulation. This provides a high quality hash ID, with the same or better entropy than what is currently used. The Flow ID is changed to protect against passive attackers wishing to do traffic analysis on flows. The Flow ID is computed based on packet parameters as well as another value, e.g., a nonce, which is changed. The frequency at which the value is changed may vary. The value should not be changed too often because that may cause excessive out of order problems, but not too infrequently to create security issues. Changing the value based on which the Flow ID is computed (and thus the Flow ID) as frequently as seconds or a few seconds may suffice, depending on a threat level. Passive attackers doing flow analysis will be frustrated by the use of Flow ID as presented herein.

To summarize, in one form, a method is provided comprising, at a network device that is to supply packets of one or more traffic flows to a network: computing a flow identifier for each of the one or more traffic flows based on information contained in one or more headers of the packets for each of the one or more traffic flows and based on at least one value that is changed on an ongoing basis; encrypting the packets for each of the one or more traffic flows to produce encrypted packets for each of the one or more traffic flows; adding an encapsulation to the encrypted packets for the one or more traffic flows; and including the flow identifier in a field of the encapsulation for a corresponding traffic flow.

In another form, one or more non-transitory computer readable storage media are provided encoded with software comprising computer executable instructions and when the software is executed operable to: compute a flow identifier for each of one or more traffic flows based on information contained in one or more headers of packets for each of the one or more traffic flows and based on at least one value that is changed on an ongoing basis; encrypt packets for each of the one or more traffic flows to produce encrypted the packets for each of the one or more traffic flows; and add an encapsulation to the encrypted packets for the one or more traffic flows; and include the flow identifier in a field of the encapsulation for a corresponding traffic flow.

In still another form, an apparatus is provided comprising a plurality of network ports configured to receive packets and to send packets into a network; and a processor configured to: compute a flow identifier for each of one or more traffic flows based on information contained in one or more headers of the packets for each of the one or more traffic flows and based on at least one value that is changed on an ongoing basis; encrypt the packets for each of the one or more traffic flows to produce encrypted packets for each of the one or more traffic flows; add an encapsulation to the encrypted packets for the one or more traffic flows; and include the flow identifier in a field of the encapsulation for a corresponding traffic flow.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network device that is to supply packets of one or more traffic flows to a network:
      computing a flow identifier for each of the one or more traffic flows based on information contained in one or more headers of the packets for each of the one or more traffic flows and based on at least one value that is changed on an ongoing basis at a frequency that is based on a level of security for the one or more traffic flows;
      encrypting the packets for each of the one or more traffic flows to produce encrypted packets for each of the one or more traffic flows;
      adding an encapsulation to the encrypted packets for the one or more traffic flows; and
      including the flow identifier in a field of the encapsulation for a corresponding traffic flow.

2. The method of claim 1, further comprising storing the flow identifier for each of the one or more traffic flows.

3. The method of claim 1, wherein the at least one value is a nonce.

4. The method of claim 1, wherein computing comprises computing the flow identifier for each of the one or more traffic flows based on a hash computation of source information and destination information obtained from the one or more headers of the packets and the at least one value.

5. The method of claim 1, wherein the flow identifier is included in a source port field of a User Datagram Protocol (UDP) header.

6. The method of claim 1, wherein the flow identifier is included in a field of a tag of a packet encapsulated according to an Ethernet tagging protocol.

7. One or more non-transitory computer readable storage media encoded with software comprising computer executable instructions and when the software is executed operable to:
   compute a flow identifier for each of one or more traffic flows based on information contained in one or more headers of packets for each of the one or more traffic flows and based on at least one value that is changed on an ongoing basis at a frequency that is based on a level of security for the one or more traffic flows;
   encrypt the packets for each of the one or more traffic flows to produce encrypted packets for each of the one or more traffic flows;
   add an encapsulation to the encrypted packets for the one or more traffic flows; and
   include the flow identifier in a field of the encapsulation for a corresponding traffic flow.

8. The computer readable storage media of claim 7, further comprising instructions operable to store the flow identifier for each of the one or more traffic flows.

9. The computer readable storage media of claim 7, wherein the at least one value is a nonce.

10. The computer readable storage media of claim 7, wherein the instructions operable to compute the flow identifier comprise instructions operable to compute the flow identifier for each of the one or more traffic flows based on a hash computation of source information and destination information obtained from the one or more headers of the packets and the at least one value.

11. The computer readable storage media of claim 7, wherein the flow identifier is included in a source port field of a User Datagram Protocol (UDP) header.

12. The computer readable storage media of claim 7, wherein the flow identifier is included in a field of a tag of a packet encapsulated according to an Ethernet tagging protocol.

13. An apparatus comprising:
   a plurality of network ports configured to receive packets and to send packets into a network; and
   a processor configured to:
      compute a flow identifier for each of one or more traffic flows based on information contained in one or more headers of packets for each of the one or more traffic flows and based on at least one value that is changed on an ongoing basis at a frequency that is based on a level of security for the one or more traffic flows;
      encrypt the packets for each of the one or more traffic flows to produce encrypted packets for each of the one or more traffic flows;
      add an encapsulation to the encrypted packets for the one or more traffic flows; and
      include the flow identifier in a field of the encapsulation for a corresponding traffic flow.

14. The apparatus of claim 13, wherein the processor is configured to store the flow identifier for each of the one or more traffic flows.

15. The apparatus of claim 13, wherein the processor is configured to compute the flow identifier for each of the one or more traffic flows based on a hash computation of source information and destination information obtained from the one or more headers of the packets and the at least one value.

16. The apparatus of claim 13, wherein the at least one value is a nonce.

17. The apparatus of claim 13, wherein the flow identifier is included in a source port field of a User Datagram Protocol (UDP) header.

18. The apparatus of claim 13, wherein the flow identifier is included in a field of a tag of a packet encapsulated according to an Ethernet tagging protocol.

* * * * *